(12) United States Patent
Bradford

(10) Patent No.: US 6,799,091 B2
(45) Date of Patent: Sep. 28, 2004

(54) ELECTRICAL ENERGY CONTROL SYSTEM

(76) Inventor: James Alfred Bradford, 389 Florence Rd., #24, Sacramento, CA (US) 95831

( * ) Notice: Subject to any disclaimer, the term of this patent is extended or adjusted under 35 U.S.C. 154(b) by 177 days.

(21) Appl. No.: 10/047,510

(22) Filed: Oct. 19, 2001

(65) Prior Publication Data
US 2003/0078698 A1 Apr. 24, 2003

(51) Int. Cl.[7] .............................................. G06F 19/00
(52) U.S. Cl. ...................................... 700/295; 700/292
(58) Field of Search ............................... 700/292, 295, 700/296

(56) References Cited

U.S. PATENT DOCUMENTS

| | | | | |
|---|---|---|---|---|
| 4,623,859 | A | * 11/1986 | Erickson et al. | ............... 335/14 |
| 5,323,307 | A | * 6/1994 | Wolf et al. | ..................... 700/22 |
| 5,675,503 | A | * 10/1997 | Moe et al. | ................... 700/296 |
| 6,055,144 | A | * 4/2000 | Reid | ........................... 361/64 |
| 6,067,483 | A | * 5/2000 | Fesmire et al. | ............. 700/296 |
| 6,181,985 | B1 | * 1/2001 | O'Donnell et al. | ......... 700/295 |
| 6,268,989 | B1 | * 7/2001 | Dougherty et al. | ........... 361/63 |
| 6,519,509 | B1 | * 2/2003 | Nierlich et al. | ............. 700/286 |
| 6,522,227 | B1 | * 2/2003 | Mody et al. | ................... 335/14 |
| 2001/0010032 | A1 | * 7/2001 | Ehlers et al. | ................. 702/62 |
| 2003/0036822 | A1 | * 2/2003 | Davis et al. | ................ 700/295 |
| 2003/0074110 | A1 | * 4/2003 | Silverman et al. | .......... 700/295 |

* cited by examiner

Primary Examiner—Leo Picard
Assistant Examiner—Elliot L. Frank
(74) Attorney, Agent, or Firm—Risto A. Rinne, Jr.

(57) ABSTRACT

An apparatus for the control of electrical energy use by an end-user includes a control panel that is disposed in an electrical distribution panel. The control panel includes a microprocessor and control lines that are adapted to set a main circuit breaker in an on or an off position as well as a plurality of the individual branch circuits. The control panel can be programmed by the end-user to comply with mandatory power outages to shut off the main circuit breaker when desired and to maintain it off for a predetermined period of time. Upon resumption of power, the control panel turns on the individual branch circuit breakers one at a time, pauses, and then turns on the next, and so on until all of the branch circuit breakers have been turned back on. According to an enhancement, the utility company can program the control panel via a telephone line and verify compliance with any required power outage.

10 Claims, 1 Drawing Sheet

ELECTRICAL ENERGY CONTROL SYSTEM

BACKGROUND OF THE INVENTION

1. Field of the Invention

The present invention, in general relates to control of electrical energy and, more particularly, to devices that turn off electrical power for predetermined time intervals.

There are certain areas where the demand for electricity exceeds supply. This results in either "brownouts" where the AC voltage is reduced or "blackouts" where AC power is interrupted.

California has suffered from numerous blackouts when the demand for electrical energy has exceeded supply. Typically, such blackouts occur for limited periods of time of up to about two hours duration at each location. Then electrical power is restored to that area and another area experiences a blackout. This pattern continues for as long as the demand exceeds the available supply of power.

The name "rolling blackouts" has been given to this condition. People who are affected by a rolling blackout experience a sudden, usually without warning, loss of power. As such their computers and other systems are shutdown abruptly. This causes much inconvenience and suffering.

It is desirable to be able to predict where and when such cessation's of power will occur. It is further desirable to be able to voluntarily comply with such blackouts, thereby lessening the damage that occurs from unexpected blackouts or the negative emotions that arise from unwelcome blackouts.

It is safe to assume that no one wants to lose their electrical power. But sometimes in today's reality it is going to occur. To be able to voluntarily select when it will occur or to select when it will occur in cooperation with a utility company will lessen such resentment. Furthermore, if those who voluntarily comply by curtailing their electrical power usage at pre-selected times experience lower monthly electrical bills at minimum inconvenience, they may actually like such a system.

While the primary focus is to lessen electrical power usage in residential and commercial locations, even local municipalities stand to benefit if, for example, street lights are cycled off at certain times.

There is another problem that occurs when power is restored and that is that a substantial load is experienced in the previously "darkened" areas. This is because additional loads come on line over time. For example, air conditioners that were off at the time the blackout occurred are likely to demand electricity for cooling when power is restored. The same is true in the winter for electric heating systems. Refrigerators, hot water heaters, compressors, pumps and the like are all likely to be in an on condition when power is restored.

Therefore, the electrical utility company experiences unusually strong loads during times that power is restored. This, at best, can cause brownouts which, in turn, can damage motors and sensitive electrical or electronic equipment.

It is desirable for both the utility company and for the end user to ensure that power is restored gradually in any given area that is subject to a blackout.

If consumers voluntarily experienced power outages and if the electrical utility companies knew the magnitude and location of these outages, the utility companies could then better manage their electrical supply and demand issues.

During times of decreased supply or increased usage, it is desirable for the utility companies to increase a requirement necessitating power outages. While this increase in the amount of time power is unavailable at any given location itself might not be entirely voluntary, the ability to select optimal times to comply certainly is a new benefit to electrical energy consumers.

An additional benefit of such a system is that a sufficient amount of electrical energy can always be assured for essential critical needs. For example, those areas where there are hospitals, police or fire departments, or other critical operations, there would always be enough power to meet their needs. This would minimize the impact of those times when electrical power demand exceeds power supply.

There is a common condition that all modern homes and businesses have and that is that electrical power is distributed through an electric service center that includes a main circuit breaker and a plurality of branch electrical circuit breakers.

It is therefore desirable to utilize the electrical service distribution center (i.e., the circuit breaker and panel) to further control the use of electrical power in homes and businesses.

Furthermore, with a blackout, all power is lost in a given area. That means the street lights and the stop lights and the emergency clinics and the respirators in the homes of the elderly all cease to operate. It is desirable to target individual homes and businesses for blackouts while keeping essential services operational.

For example, emergency clinics or the infirm that depend on life-assistance or life-support devices could be exempt from blackouts even though the adjoining businesses or neighbors are without power. Such is not possible at present.

The unexpected and indiscriminate cessation of electrical service not only posses an inconvenience to the end user, it may also incur a liability on the part of the electric utility company. If the utility company shuts down electrical power for a given area to lessen demand, they may inadvertently stop the use of a respirator in some person's home without warning.

This act may well imperil the life of the end user and it may also expose the utility company to litigation where they may have to answer difficult questions as to why didn't they anticipate this situation and provide notice or warning or why didn't they shut down some other less-critical area instead? Clearly, utility companies want to avoid indiscriminate and sudden power outages.

Accordingly, there exists today a need for an electrical energy control system that can be used with conventional types of circuit breakers to curtail power consumption at predetermined periods of time.

Clearly, such a system would be useful and especially desirable.

2. Description of Prior Art

Home energy management systems are, in general, known. For example, the following patents describe various types of these devices:

U.S. Pat. No. 5,818,725 to McNamara et al., Oct. 6, 1998;

U.S. Pat. No. 5,528,507 to McNamara et al., Jun. 18, 1996;

U.S. Pat. No. 4,644,320 to Carr et al., Feb. 17, 1987; and

U.S. Pat. No. 4,350,980 to Ward, Sep. 21, 1982.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide an electrical energy control system that will shut down power consumption in a house for a predetermined time period.

It is also an important object of the invention to provide an electrical energy control system that will shut down power consumption in a house for a predetermined time period and then restore power.

Another object of the invention is to provide an electrical energy control system that will shut down power consumption in a house for a predetermined time period and then restore power progressively.

Still another object of the invention is to provide an electrical energy control system that will shut down power consumption in a house for a predetermined time period and then restore power one branch circuit at a time.

Still yet another object of the invention is to provide an electrical energy control system that will allow end-users of electrical power to cooperate with utility companies to select the most favorable times for interruptions in electrical service.

Yet another important object of the invention is to provide an electrical energy control system that can provide an exemption sparing critical or essential users from having to experience power interruptions from fluctuations in supply and demand.

Still yet another important object of the invention is to provide an electrical energy control system that is adapted to shut down electrical usage when necessary for non-critical or non-essential users while still retaining electrical power availability to those whose needs are critical or whose services are deemed essential.

Still one other object of the invention is to provide an electrical energy control system that is in communication with electrical utility companies (or a monitoring agency) to ensure compliance with mandatory reductions or interruptions in electrical power usage.

Still one further object of the invention is to provide an electrical energy control system that can save money for end-users.

Still one more further object of the invention is to provide an electrical energy control system that can reduce electrical consumption for an end user.

Briefly, an electrical energy control system that is constructed in accordance with the principles of the present invention has a service panel with a main circuit breaker and a plurality of branch circuit breakers that control the branch circuits. A circuit board is disposed in the service panel that includes a microprocessor and a clock timer and means for turning the main breaker and, preferably also the branch breakers on and off subsequent to the combined needs of the utility power company and an end user of the electrical power. The circuit board preferably also includes means for communicating with the utility company. The end user is able to voluntarily program which of the individual breakers will be shut off and at what times this will occur to voluntarily limit his electrical consumption. If the utility requires mandatory blackouts, the user is able to program those into the circuit board as well or possibly to select a particular time for a total power outage (i.e., a blackout) from a range of possible choices that are offered by the utility company. When power is restored, the microprocessor sequentially turns on the individual breakers over time, thereby lessening the instantaneous load that occurs upon the resumption of service. The utility company, according to a modification, is in direct communication, such as over a telephone line and through a modem, with the microprocessor and can program and initiate power outages by remotely programming the microprocessor. The utility can also poll the microprocessor to verify compliance.

DETAILED DESCRIPTION OF THE INVENTION

Figure 1:
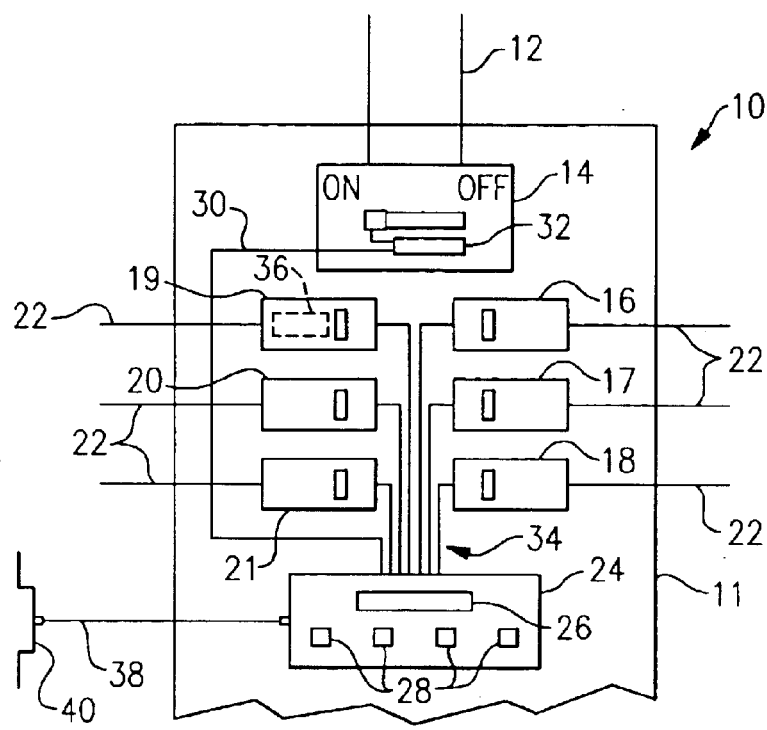
FIG. 1 is a block diagrammatic view of a electrical panel using an electrical energy control system.

Referring to FIG. 1 is shown, an electrical energy control system, identified in general by the reference numeral 10.

An electrical circuit breaker panel 11 receives power from a main supply line 12 which passes through a main breaker 14. The main breaker 14 turns power on and off to all of a plurality of branch circuit breakers 16–21. The branch breakers 16–21 supply power where needed through a plurality of individual branch circuits 22.

A control panel 24 is preferably mounted in the panel 11 or it may be disposed proximate the panel 11. The control panel 24 is a circuit board that includes a microprocessor and related circuitry to function as described herein.

The control panel 24 includes a display 26 that shows its mode of operation and is useful during programming. A plurality of switches 28 allow setting a real-time clock and programming the microprocessor as necessary.

A main control line 30 is an output line from the control panel 24 that controls the position of the main breaker 14, which is normally on (and would be on if power failed).

The main breaker 14 has a solenoid 32 attached to it, either on the surface as an add-on accessory or preferably built into the main breaker. The solenoid 32 responds to the signal on the main control line 30 as determined by the microprocessor to determine whether the main breaker 14 is on or off.

A battery backup is included in the control panel 24 to ensure proper operation during power outages, sometimes called blackouts, and if a blackout is required when demand exceeds supply, it is called a rolling blackout.

A plurality of individual branch control lines, identified in general by the reference numeral 34, control similar solenoids that are attached to or included in each of the branch breakers 16–21. One branch solenoid 36 is shown in dashed lines atop branch breaker 19.

As many branch control lines 34 are present as are there branch circuit breakers 16–21. More can be used than is shown herein.

A telephone line 38 extends from the control panel 24 to a wall mounted connection 40. A modem is included in the control panel 24 to allow the microprocessor to communicate over the telephone line 38.

Figure 2:
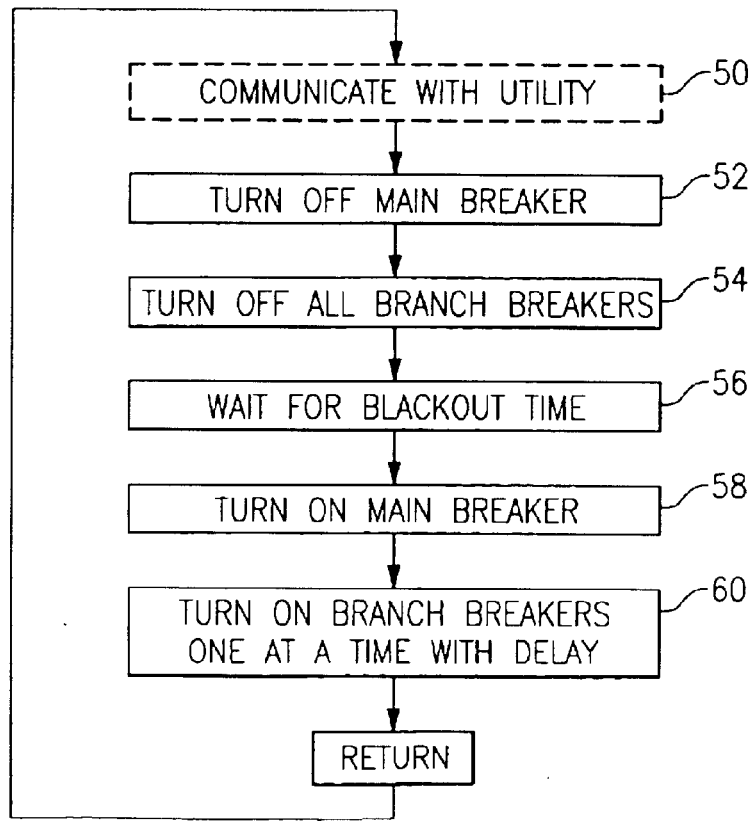
FIG. 2 is a flowchart of operation during a rolling blackout.

Referring now to FIG. 2, a flowchart shows operation during a rolling blackout. A utility company determines the need location and duration for such types of power outages.

The control panel 24 can be manually programmed to conform with mandatory rolling blackouts and other types of power outages, therefore connection over the telephone line 38 is not necessary for operation to occur.

However it is preferred to provide direct communication with the utility company over the telephone line 38. To indicate this function it is shown in dashed lines where the control panel 24 is adapted to communicate 50 with the utility company.

As such, the utility company can download a program in advance (identified by function 50) programming the microprocessor in the control panel 24 when it must shut off the main breaker 14 and for how long.

This communication can come minutes before a rolling blackout is to affect the area or much further in advance. This is useful in that a homeowner can look at the display 26 and determine when a blackout will occur.

The microprocessor can even be programmed to call the homeowner, for example at work, subsequent to receiving such a communication from the utility company and let the homeowner know that a power outage is scheduled (i.e., will occur unless the utility company cancels the need for one via the telephone line 38) for their home from 11:00 AM to 1:00 PM that day.

The homeowner, knowing this, can decide whether or not to go home for lunch, for example. He may not want to go home to a dark house or he may wish to go home and check on its status or the status of a loved one.

The next step is to turn of the main breaker (identified by function 52) when the time is at hand. This kills power in the entire house (or business) and is done by the control panel 24 outputting by action of the microprocessor the signal on the main control line 30 which the solenoid 32 responds to by shutting the main breaker 14 off.

It is important to note that the signal is active to turn the main breaker 14 off. When the control panel 14 is idling or when it is first powered up, the signal on the main control line 30 is inactive and the main breaker 14 is on (unless it is or has been manually overridden). A spring may be used to manually override the solenoid 32 thereby turning off the main breaker 14 (or any of the branch breakers 16–21) when the control panel 24 has them on.

After the main breaker 14 has been turned off, the control panel 24 outputs an active signal over the branch control lines 34 to turn off all of the branch breakers 16–21 identified by function 54.

The microprocessor will wait for the time of the blackout to elapse, as identified by function 56. This could be typically one or two hours, more or less. It could also change if changes in supply or demand occur as well.

For example, either the homeowner or the utility company via the telephone line 38 can program a two hour rolling blackout from 11:00 AM to 1:00 PM on a given day as was mentioned above. If an abrupt change occurs at 11:30 AM where additional power becomes available to the utility company or if demand drops, the utility company can transmit a message over the telephone line 38 to the control panel 24 immediately ending the mandatory rolling blackout.

As such, it can be seen that the date and time for waiting 56 is a variable that can be programmed into the control panel 24 by the homeowner or by the utility company and that it can be changed on demand by the utility company, but not by the homeowner if it is a mandatory blackout. Therefore, the function to communicate with the utility 50 can occur at anytime.

The utility company may make available to those who have the electrical energy control system 10 installed in their homes or business the ability to choose when they want to experience a blackout from amongst a plurality of choices. Obviously, the choices may not please the end-user because they must reflect the needs of the utility company over that of the end-user, still some choice is better than none.

As such, the homeowner or business owner can program when they choose to experience their mandatory blackout.

After the required time for the blackout has elapsed, the microprocessor changes the signal on the main control line 30 so that is inactive. The solenoid 32 responds by turning on the main breaker 14. This function is shown in block 58.

It is important to note that all of the branch breakers 16–21 remain off at this time. The microprocessor then begins to selectively, one at a time, turn the individual branch breakers 16–21 back on. A small tire delay elapses, and then the next of the branch breakers 16–21 is turned back on. This process is repeated until all of the branch breakers 16–21 have been turned back on. The entire process to turn all of the branch breakers 16–21 back on could take from one to two minutes typical, depending upon how many branch circuits are in the panel 11. This function is shown in block 60.

The purpose is to gradually increase the load experienced by the utility company upon the resumption of electrical service. Presently, a large abrupt load is experienced as many high current devices (motors on refrigerators, freezers, compressors, etc.) suddenly all turn on. A few seconds later, this load drastically decreases (because starting current is typically three times more than running current).

As such, the utility company experiences an enormous sudden load that in several seconds lessens substantially. For the first several seconds to minute or so, the utility company has a difficult time regulating voltage. Spikes can occur which can damage equipment that is on line or an overload condition can cause power to be lost as the utility companies breakers trip.

By staggering the turning on of the individual branch circuits over a minute or so, the utility company is spared the huge initial start up load. This is true if most of its users have the electrical energy control system 10 installed. This is of benefit to every user because of fewer voltage swings or spikes.

The system 10 then communicates over the telephone line 38 that compliance with the rolling blackout or other electrical power emergency has occurred. The user may receive rate discounts or other incentives from the utility company for installing such a system, including possible rebates on its cost of purchase and/or installation.

Since the capability is there to individually affect the branch circuits 16–21, the homeowner can program the control panel 24 on his own (without input from the utility company) to shut off certain branch circuits 16–21 when desired. For example, the hot water heater may be shut off during each day to save electricity.

The specific identity of the system 10 can be made known to the utility company either by the uniqueness of the telephone number that is used to access the system 10 or the control panel 24 can include a unique address or a unique identification number, preferably stored in a non-volatile memory.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. An electrical energy control system adapted for use with an electrical distribution panel, comprising:
   (a) means for controlling a main circuit breaker that is adapted to turn said main circuit breaker off and on;
   (b) means for controlling a plurality of branch circuit breakers that is adapted to turn each of said plurality of branch circuit breakers off and on; and
   (c) control means adapted for controlling said main circuit breaker and said plurality of branch circuit breakers and wherein when said main circuit breaker is off no electrical power is supplied to any of said plurality of branch circuits and wherein whenever electrical power to said main circuit breaker is interrupted or whenever said main circuit breaker is off said control means turns off all of said plurality of branch circuits and wherein subsequent to a restoration of electrical power to said main circuit breaker or when said main circuit breaker is urged into an on position said control means is adapted to sequentially turn on each of said branch circuit breakers beginning with a first of said plurality of branch circuits, retaining said first in an on position and then turning on a second of said plurality of branch circuits, retaining both said first and said second in an on position, and then turning on in like manner all of a remainder of said plurality of branch circuits until all of said branch circuits have been turned on; and wherein said control means includes a control panel, and wherein said control panel includes a circuit panel and wherein said circuit panel includes a microprocessor, a real-time clock, a battery, a display, and means adapted for programming said microprocessor, and wherein said microprocessor includes a main control line that is operatively attached to a solenoid and wherein said solenoid is adapted to turn said main circuit breaker on arid off in accordance with a signal that is supplied by said microprocessor on said main control line.

2. The electrical energy control system of claim 1 wherein said microprocessor includes means for communicating with a remote location.

3. The electrical energy control system of claim 2 wherein said remote location includes a utility company.

4. The electrical energy control system of claim 3 wherein said microprocessor is adapted to be programmed by said utility company at which time and for what duration said main circuit breaker is to be in the off position.

5. The electrical energy control system of claim 4 wherein said system is adapted to communicate with said utility company to confirm compliance that said main circuit breaker was in the off position beginning at said time and lasting for said duration.

6. The electrical energy control system of claim 2 wherein said remote location includes an end-user of electricity supplied by a utility company.

7. The electrical energy control system of claim 1 wherein said control means is adapted to include a time delay after said control means has sequentially turned on one of said branch circuit breakers prior to turning on another of said branch circuit breakers.

8. The electrical energy control system of claim 1 wherein said means for controlling a main circuit breaker includes a solenoid attached to said main circuit breaker.

9. The electrical energy control system of claim 1 wherein said means for controlling a plurality of branch circuit breakers includes a branch solenoid attached to each of said branch circuit breakers.

10. An electrical energy control system adapted for use with an electrical distribution panel, comprising:
    (a) means for controlling a main circuit breaker that is adapted to turn said main circuit breaker off and on;
    (b) means for controlling a plurality of branch circuit breakers that is adapted to turn each of said plurality of branch circuit breakers off and on; and
    (c) control means adapted for controlling said main circuit breaker and said plurality of branch circuit breakers and wherein when said main circuit breaker is off no electrical power is supplied to any of said plurality of branch circuits and wherein whenever electrical power to said main circuit breaker is interrupted or whenever said main circuit breaker is off said control means turns off all of said plurality of branch circuits and wherein subsequent to a restoration of electrical power to said main circuit breaker or when said main circuit breaker is urged into an on position said control means is adapted to sequentially turn on each of said branch circuit breakers beginning with a first of said plurality of branch circuits, retaining said first in an on position and then turning on a second of said plurality of branch circuits, retaining both said first and said second in an on position, and then turning on in like manner all of a remainder of said plurality of branch circuits until all of said branch circuits have been turned on; wherein said control means includes a control panel, and wherein said control panel includes a circuit panel and wherein said circuit panel includes a microprocessor, a real-time clock, a battery, a display, and means adapted for programming said microprocessor, and wherein said microprocessor includes a main control line that is operatively attached to a solenoid and wherein said solenoid is adapted to turn said main circuit breaker on and off in accordance with a signal that is supplied by said microprocessor on said main control line, wherein said microprocessor includes means for communicating with a remote location, wherein said remote location includes a utility company, wherein said microprocessor is adapted to be programmed by said utility company at which time and for what duration said main circuit breaker is to be in the off position, and wherein said system is adapted to communicate with said utility company to confirm compliance that said main circuit breaker was in the of f position beginning at said time and lasting for said duration.

* * * * *